United States Patent
Pandya et al.

(10) Patent No.: US 12,169,983 B1
(45) Date of Patent: Dec. 17, 2024

(54) AUTOMATED HEADSHOT RANKING FOR RETRIEVAL AND DISPLAY

(71) Applicant: Amazon Technologies, Inc., Seattle, WA (US)

(72) Inventors: Yash Pandya, Navi Mumbai (IN); Abhinav Aggarwal, New Delhi (IN); Lokesh Amarnath Ravindranathan, Bangalore (IN); Laxmi Shivaji Ahire, Malegaon (IN); Manivel Sethu, Bangalore (IN); Kaustav Nandy, Bengaluru (IN); Nihal Shandilya, Bangalore (IN)

(73) Assignee: Amazon Technologies, Inc., Seattle, WA (US)

(*) Notice: Subject to any disclaimer, the term of this patent is extended or adjusted under 35 U.S.C. 154(b) by 330 days.

(21) Appl. No.: 17/712,730

(22) Filed: Apr. 4, 2022

(51) Int. Cl.
| | |
|---|---|
| G06V 40/16 | (2022.01) |
| G06T 7/77 | (2017.01) |
| G06V 10/72 | (2022.01) |
| G06V 10/774 | (2022.01) |

(52) U.S. Cl.
CPC .............. G06V 40/168 (2022.01); G06T 7/77 (2017.01); G06V 10/72 (2022.01); G06V 10/774 (2022.01); G06V 40/174 (2022.01); G06T 2207/10016 (2013.01); G06T 2207/20132 (2013.01)

(58) Field of Classification Search
None
See application file for complete search history.

(56) References Cited

U.S. PATENT DOCUMENTS

| | | | | |
|---|---|---|---|---|
| 7,643,685 | B2 * | 1/2010 | Miller | G06V 10/772 |
| | | | | 299/1.4 |
| 2006/0173628 | A1 * | 8/2006 | Sampas | G06T 7/73 |
| | | | | 382/128 |
| 2007/0211928 | A1 * | 9/2007 | Weng | G06V 20/695 |
| | | | | 382/128 |
| 2008/0089561 | A1 * | 4/2008 | Zhang | G06V 10/771 |
| | | | | 707/E17.024 |
| 2014/0375886 | A1 * | 12/2014 | Galleguillos | G06V 40/173 |
| | | | | 348/571 |
| 2021/0125001 | A1 * | 4/2021 | Guo | G06F 16/55 |
| 2021/0174153 | A1 * | 6/2021 | Rane | G06F 18/217 |
| 2021/0331323 | A1 * | 10/2021 | Ding | B25J 9/1697 |

* cited by examiner

*Primary Examiner* — Jiangeng Sun
(74) *Attorney, Agent, or Firm* — Lee & Hayes, P.C.

(57) ABSTRACT

Systems and techniques for ranking and selection of headshots from a collection of images. The systems and techniques for ranking use heuristics to rank extracted headshots from a set of images based on features of the faces within the images. The ranking may be used to generate a training dataset for a machine learning model to determine quality scores for faces within images. The ranked images may then be stored for later access in reference to a video or set of images containing the individual.

17 Claims, 7 Drawing Sheets

AUTOMATED HEADSHOT RANKING FOR RETRIEVAL AND DISPLAY

BACKGROUND

Headshots are an integral way to identify and focus on an individual in various forms of media, including digital media. Headshots may be viewed in various locations including online video platforms, photo galleries, actor profile pages, retail websites, music websites, news articles, social media, etc. While headshots are a popular medium for identifying individuals, many headshots lack consistency and quality that may be useful for readily identifying individuals from headshots. Getting a professional headshot is an expensive and time-consuming operation. Given the high cost to obtain a professional headshot and high demand, there exists a lack of high-quality consistent headshots. As a result, many headshots are unprofessional or not useful for identifying individuals and create a sub-optimal user experience as faces in the headshots may be difficult to recognize. Ranking of possible headshots is a fundamental problem in information retrieval. Ranking possible headshots from a set of images provides an opportunity for selecting high-quality headshots from among a set of images. Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
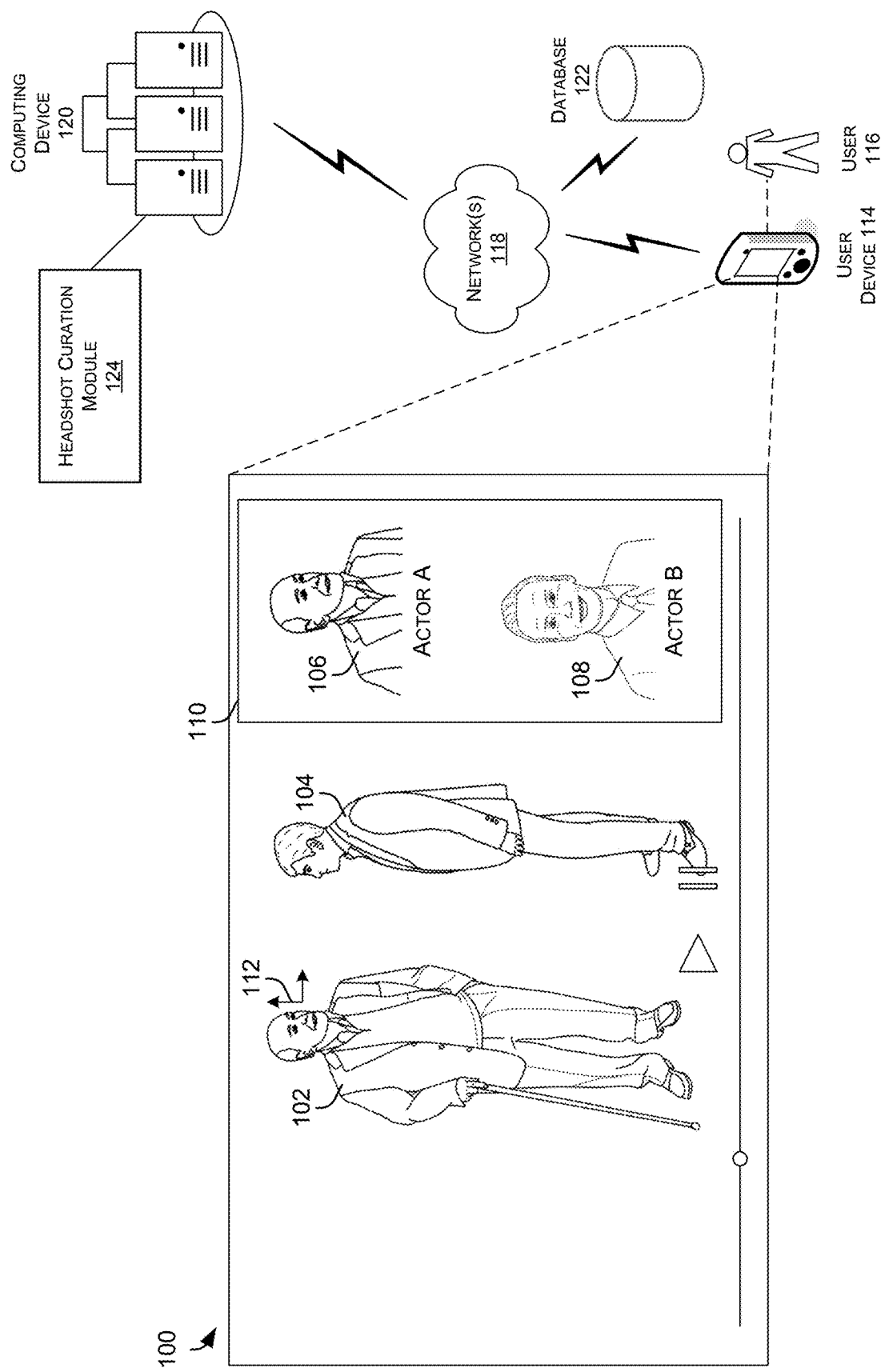
FIG. 1 illustrates an example of a frame of video data with associated metadata presented in an informational pane including a curated headshot and identification of the individuals within the frame using the curated headshots, according to the present description.

Described herein are, among other things, techniques, devices, and systems, for ranking and selecting individual headshots from accessed image data. The techniques and systems described herein provide for selecting a headshot among a selection of images, including a selection of headshots extracted from videos and/or from a gallery of headshots for individuals. The headshots may include large datasets of headshots extracted from source video. In some examples, a video display system hosted on one or more computing devices enhances a viewing experience for customers by enabling further exploration and learning about the individuals within the video as well as providing clear identification guides during playback of the video. Generating such tagged individual data and metadata associated with the video requires identifying all occurrences of the actors accurately in the video and can be a time intensive manual operation for each and every video. This information is usually surfaced to the customers as actor names and headshots and may also be available in promotional or informational material associated with the video. Due to increased rollout and availability of such informational systems and metadata across the globe for international video content, demand and need for metadata describing video data is increasing, thereby increasing labor requirements to generate the same. The increasing growth and availability of video content around the globe increases the scale of metadata that needs to be identified and tagged, thereby compounding the manpower requirements for tagging actors within the video data. As such, automated headshot systems may extract and/or generate headshots from the video data and/or sources of image data related to the actors.

The large quantities of headshots must then be sorted to find a suitable or high-quality headshot among the set of images. The headshots are selected based on one or more qualities or characteristics. In typical systems a headshot may have to be selected by a human operator which can be time intensive and expensive to perform. The techniques and systems described herein provide for determination of headshot quality and ranking based on one or more characteristics. Determination of the quality of a face is a common subproblem in identification of actors in a video or from a collection of images in a gallery. The solutions provided herein enable selection of a representative face for a cluster of faces. These representative faces may be used for both automated and manual matching.

In an illustrative example, the systems and techniques herein describe a fully-automated process for selection of a single aesthetically pleasing headshot from a large set of face images. These face-images can be extracted from a video, as described with respect to U.S. patent application Ser. No. 17/710,679, titled "HEADSHOT EXTRACTION AND CURATION," filed Mar. 31, 2022, or obtained from an image gallery. Images in gallery and/or extracted from the video have high temporal redundancies and artistic effects. The range of headshot conditions (such as illumination, location, background homogeneity, focus, sharpness, etc.) may be wide and varied and unpredictable for such a dataset. The faces in the set of images also have diverse pose, occlusions, and different expressions. The techniques and systems herein provide a robust algorithm to cater to the problem of identifying representative images from the set of images that provide a standardized experience to the customers.

The example technique for identifying the representative image includes two phases. In a first phase, a cascade of filters is implemented to filter out faces that perform poorly in a series of tests. The filtering operation is performed after each of the cascade of filters by rejecting low quality faces based on feature criteria. The feature criteria may include inputs of face size (e.g., resolution), face quality scores (e.g., from a deep learning model for identifying face quality with stress on face sharpness), face pose (inferred using a deep learning model), and illumination of the faces. After the iterative filtering of the images using the cascaded filters, the faces may be ranked according to their scores on the various filters and tests. A highest ranked remaining face after the cascade of filters may be selected as the representative face.

In a second phase, the ranking of the face images from the first phase may be used to generate a scoring mechanism for headshot quality score determination. The quality score may be determined based on a percentile score describing the percentile rank of each image among the set of images for an individual for each feature in a heuristic score function to obtain weak supervision labels for training a machine learning model to predict a face quality score between 0 and 1. The quality scores may be based on one or more heuristics. A first heuristic is based on a combination of percentile scores while a second heuristic is based on a score derived from bucketing of percentiles of individual feature quality measures. The individual features may include illumination, resolution, sharpness, roll, pitch, and yaw as input quality features to train the machine learning model. The machine learning model may be trained using the dataset derived from the heuristics and scores and may subsequently be used to generate further quality scores for further sets of images.

The techniques and systems described herein can be implemented in different scenarios including video content delivery platforms, image gallery curation, and other such databases. The techniques may also extract the faces from the video and groups the faces based on identity before extracting an optimal face from the video given the face groups. This selected face can be shown to the customers whenever the customers engage with metadata or informational panels associated with the video content.

Having now discussed examples of the systems and methods described herein, FIG. 1 illustrates an example of a frame 100 of video data with associated metadata presented in an informational pane 110 including a curated headshot and identification of the individuals within the frame using the curated headshots, according to the present description. The frame 100 and the informational panel 110 may be displayed on a user device 114 viewed and accessible by the user 116 on the user device 114. The informational panel 110 may include metadata and information about the video content displayed on the user device 114 that the user 116 may view and interact with. A headshot is a type of portrait that is typically a tightly cropped photo of the face, from the shoulders up. The subject is camera aware—typically looking right in the lens. The headshot may be used for marketing, individual identification, hiring, casting, and other such purposes. The frame 100 may be a still image of a set of images defining a video. The frame 100 may also be an example of a single still image that serves as a source of image data for headshot curation for at least one of the individuals 102, 104. The individuals 102, 104 are pictured within the frame 100 while the informational pane 110 includes information about each individual visible within the frame 100. The informational pane includes a first headshot 106 and a second headshot 108, the first headshot 106 and the second headshot 108 showing the faces of the individuals 102, 104.

In the illustrative example, the frame 100 is a single frame of a set of frames making up a video when arranged and played sequentially. The frame 100 is therefore a single stationary image. The frame 100 may be displayed on a display device of a computing device as a user is watching a video. The user may pause the video to show the frame 100 and the informational panel 110. For example, the user may be pausing the video to attempt to ascertain the identities of the actors within the frame 100. When the video is paused, the user may have access to the informational panel 110 where information related to the video, the frame 100, and/or the individuals 102 and 104 such as the identities of the individuals 102 and 104 as well as selected headshots for each.

The headshot curation system and techniques described herein may select the first headshot 106 and/or the second headshot 108 from among a set of images including a selection of headshot images that may be extracted from the video represented by frame 100 and/or from a gallery of headshot images. The headshots making up the source of images may be stored in a database 122 associated with a computing device 120 where a software module for selecting the representative headshot from among the source of images may be hosted.

In the illustrative example, the headshot curation module 124 provides a fully-automated process for selection of a single aesthetically pleasing headshot from a large set of face images stored within the database 122. Images stored in the database 122 may vary widely in artistic effects and style as well as quality according to various metrics. The range of headshot conditions (such as illumination, location, background homogeneity, focus, sharpness, etc.) may be wide and varied and unpredictable for such a large dataset. The faces in the set of images on the database 122 also have diverse pose, occlusions, and different expressions. The headshot curation system identifies representative images from the set of images of the database 122 that provide a standardized experience to the user 116 via the user device 114.

The headshot curation system may determine the representative headshot to display at the user device 114 by accessing the images from the database 122 and evaluating the images from the database 122 for various features. The images from the database include a subset of all images at the database, the subset including images showing a particular individual. The images at the database may be sorted according to identities of individuals within the images. The individuals may be identified from the images using a facial recognition algorithm, the facial recognition algorithm used to identify the subset of the images having a representation of the same individual shown therein. In a first example, the headshot curation module 124 may determine one or more cost functions that may be used to evaluate the set of images from the database 122. The cost functions may include a pose cost function, a size cost function, a face cost function, a brightness cost function, a sharpness cost function, and/or a feature cost function. The various cost functions determine costs for the features described herein using various explicit and machine learning models. For example, the brightness cost function may be calculated using an equation based on calculating a mean value of brightness over the area of the pixels of the image, in a second example, the size cost is determined by calculating a pixel area of a bounding box around the face of the individual. Other cost functions, such as the sharpness and pose cost determinations, may be calculated using face recognition systems and tools, such as FaceQNet, Deep Gaze, Hopenet, FSANet, etc., that include machine learning tools to generate a score reflective of the feature for the cost function. The pose cost function may describe the pose of the face of the individual within the images, with a low cost associated with a front-facing head within the images while a high cost is associated with a face directed away from an imaging device that captured the image. The costs determined by the cost functions include scores, that may include a numerical value between 0 and 1 reflective of the feature, with a low cost being associated with the feature being reflected in a favorable manner in the image. In some examples, the costs calculated by the various cost functions for the different features may be aggregated to generate an overall score for the image. The aggregated score may be generated using an average, sum, or other arithmetic operation to generate a combined score reflecting multiple costs from multiple features together. The size cost function may be associated with a resolution of the image at the location of the face, with a low cost associated with a high-resolution image for the face. The face cost function may be a combination of other cost functions, such as adding the poise cost function and the size cost function together, among other cost functions, to produce a final cost function for the face. Other cost functions may provide costs for the images based on a brightness, sharpness, or other image feature, characteristic, or quality of the images. The brightness cost function may be determined by calculating the brightness of the face image by calculating a mean value of the brightness across the pixels of the image, with lower average brightness associated with a lower mean value of brightness across the pixels. The size cost function may be implemented by first identifying faces from within the image data of the database 122 using a face detection algorithm on the images. An example of such an algorithm that may be used for defining a bounding box surrounding a face within an image is described in Zhang, K., Zhang, Z., Li, Z., & Qiao, Y. (2016). Joint face detection and alignment using multitask cascaded convolutional networks. *IEEE Signal Processing Letters,* 23(10), 1499-1503. The area of the bounding box, described with respect to pixels, and thereby reflective of the resolution of the image, may be used for determining the size cost, with a larger pixel area or resolution associated with a lower size cost. The sharpness cost may include a facial recognition system such as FaceQNet, described in Hemandez-Ortega, Javier & Galbally, Javier & Fierrez, Julian & Haraksim, Rudolf & Beslay, Laurent. (2019). FaceQnet: Quality Assessment for Face Recognition based on Deep Learning, which may judge the sharpness of the image and output a score between 0 and 1 for suitability of the image for face matching. The pose cost function may use various proprietary and open-source solutions, including Deep Gase, Hopenet, FSANet, etc., to calculate a roll, pitch, and yaw value for a face within an image.

After evaluating the cost value for each of the images in the database 122, the headshot curation module 124 determines a representative image based on the cost values. In some examples, the representative image is selected based on the representative image having a smallest cost score among the cost scores of all images in the database 122. In some examples, the representative image may be selected based on one or more cost scores, the face cost score, and/or averages of the cost scores identifying images with the most suitable characteristics for an aesthetically pleasing representative image.

In some examples, the headshot curation module 124 may also determine representative images in two phases. In a first phase, a cascade of filters is implemented to filter out faces which perform poorly in a series of feature evaluations through the filtering. A cascade of filters includes multiple filters performed sequentially on sets of images. The cascade of filters perform evaluations of a feature at each level of the cascaded filters, with each level of the filters evaluating a cost of the feature associated with the particular filter. The filtering operation is performed after each of the levels of the cascade of filters by rejecting low quality faces based on feature criteria. The feature criteria may include inputs of face size (e.g., resolution), face quality scores (e.g., from a deep learning model for identifying face quality with stress on face sharpness), face pose (inferred using a deep learning model), and illumination of the faces. After the iterative filtering of the images using the cascaded filters, the faces may be ranked according to their scores on the various filters and tests. A highest ranked remaining face after the cascade of filters may be selected as the representative face.

In a second phase, the ranking of the face images from the first phase may be used to generate a scoring mechanism for headshot quality score determination. The quality score may be determined based on a percentile score describing the percentile rank of each image. The percentile score may be based on the rank of each image relative to the other images within the set. For example, in a set of 100 images, sorting the images by the scores for the features, with each of the images arranged in increasing order of the feature score. The percentile rank corresponds to the location of the image within the ranked listing. The percentile rank may be reflected as a percent, reflective of the feature score as it relates to the function scores of the other images. The feature scores may be determined by a heuristic score function to obtain weak supervision labels for training a machine learning model to predict a face quality score between 0 and 1. For example, after determining the feature scores and arranging the images according to the quality scores, the percentile rank may be determined and assigned to a quality score between 0 and 1. The quality scores may be based on one or more heuristics. A first heuristic is based on a combination of percentile scores while a second heuristic is based on a score derived from bucketing of percentiles of individual feature quality measures. Bucketing the individual feature quality measures may include grouping images having feature quality scores within a threshold amount of one another. The bucketed quality measures may then be assigned to percentile ranks based on the ranges of feature measures for each bucket. The individual features may include illumination, resolution, sharpness, roll, pitch, and yaw and the evaluations of each of the features for the images performed, with the resulting feature evaluations and images be used to train the machine learning model. The machine learning model may be trained using the dataset derived from the heuristics and scores and may subsequently be used to generate further quality scores for further sets of images. For example, after determining quality scores for a first set of images using heuristics and/or machine learning models, the quality scores for the set of images may be determined as described herein, and the resulting images and quality scores may be used to train a new machine learning model that receives inputs of images and outputs quality scores for the images directly without requiring individual feature evaluation.

The headshot curation module 124 may select the representative headshots as described herein and subsequently provide the representative headshots for each individual 102 and 104 within the informational panel 110.

Figure 2:
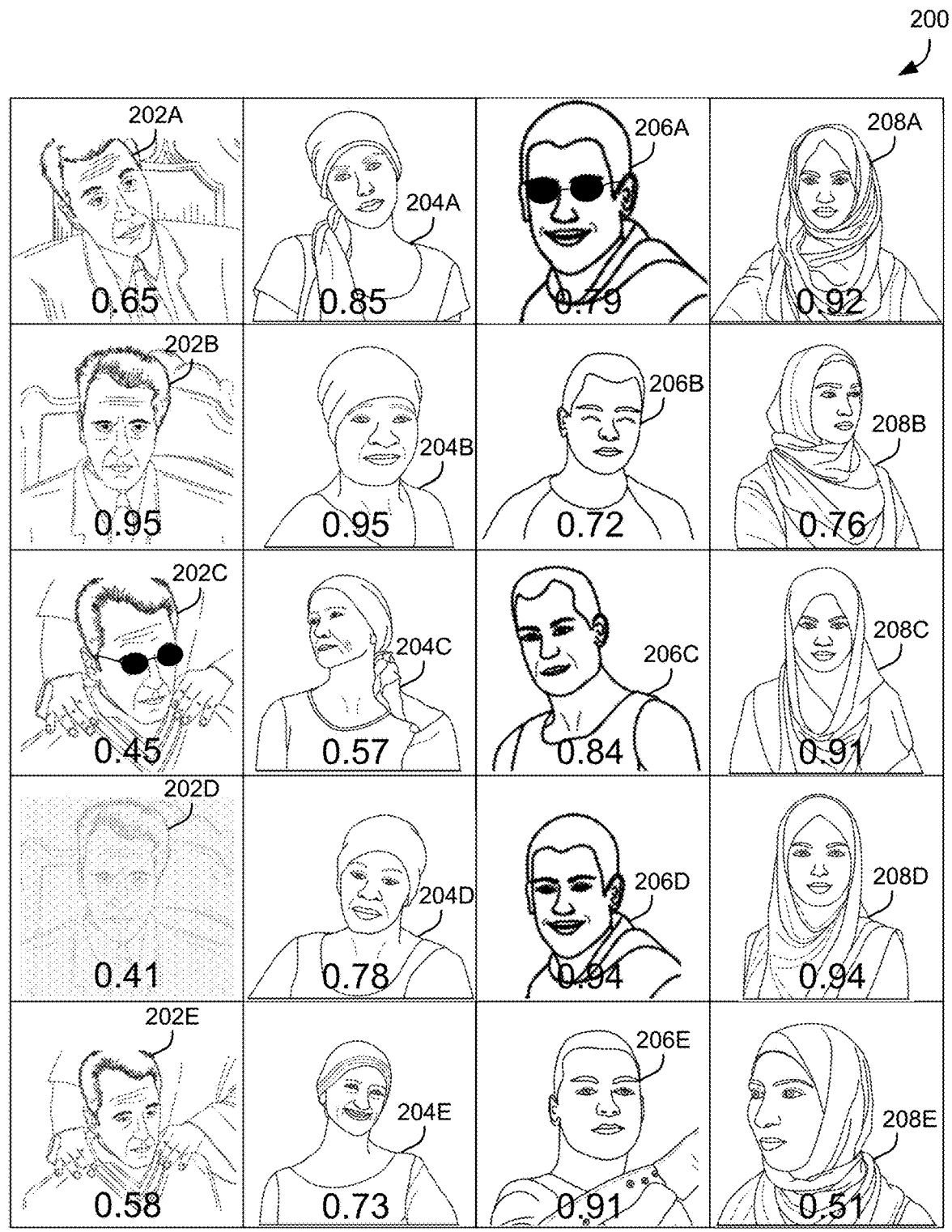
FIG. 2 illustrates a selection of headshot images for four individuals, the headshots selected from different source images and having different features and having quality scores associated therewith.

FIG. 2 illustrates a selection of headshot images 200 for four individuals, the headshots selected from different source images and having different features and having quality scores associated therewith. The headshot images 200 may be examples of images extracted from different sources such as video images. The headshot images 200 each have associated quality scores that may be associated with the cost values described above and/or may be related to evaluations of features and/or characteristics within the images.

The headshot images 200 may be evaluated to determine the quality scores. Because the performance of any face recognition system (automated or manual) is highly influenced by the variability of the samples of the images, there are many possible factors from the image acquisition conditions which effect its suitability for a recognition system—illumination, location, background homogeneity, focus, sharpness, etc. There are also many factors associated to the properties of the face itself like pose, presence of occlusions, and different expressions.

In the headshot images 200, the score associated with each may be based on one or more of the features of the images. For example, in images 202A-202E, the image 202D has a lowest score that may be associated, at least in part, with a blurriness or lack of clarity of the image. Additionally, in image 202C, the obstruction of the user's eyes by sunglasses may result in a lower feature score for ranking the images. Additional features for evaluation may include the pose, with the pose of image 202B, facing directly towards the camera, resulting in a relatively high score (e.g., on a scale of 0 to 1). In other images, the gaze of the viewer and pose of the head may be off-center and further away from the imaging device that may result in a lower score for the headshots.

In the headshot images 200, additional features may be evaluated, such as the open-ness of eyes within the image (as reflected in image 206B) resulting in changes to the scores. The smile of the individual may and/or other facial expressions may also be evaluated by a feature scoring module to result in higher scores for images having particular facial expressions (e.g., prioritizing smiling facial expressions over frowning faces or angry faces).

In some examples, the headshot images 200 may be illustrative of scores output for a set of images that may be used for representative image selection. The scores may be generated based on heuristics or according to other techniques described herein. The headshot images 200 may also be illustrative of training data for a machine learning model used to determine scores for one or more images in a set of images. The scores may, in such examples, be expert-defined and/or determined using a filtering approach as described with respect to FIG. 3.

In the images of FIG. 2, looking at the images 202A-202E, the scores may be reflective of one or more features that may be used to rank the images relative to one another. The scores are illustrative and not intended to be absolute reflections of scores for the images. The first image 202A is shown with a score of 0.65 that may be reflective of the pose of the face being directed away from the camera, the face being misaligned, and the facial expressions of the face. The second image 202B is shown with a score of 0.95 (e.g., a high score) reflective of the face being posed directly towards the camera, the face being unobscured, the image being clear and sharp, and the image being well illuminated. The third image 202C is shown with a score of 0.45 that may be reflective of the face and eyes being partially obscured by the sunglasses, the face having a pose directed away from the camera, the face being misaligned, and may also be reflective of the clarity of the image. The fourth image 202D is shown with a score of 0.41 reflective of a low quality score, the low score a result of a low brightness and low clarity or sharpness of the image 202D. The result is an image 202D that is difficult to observe and identify the individual, therefore resulting in the low score. The fifth score 202E is shown with a score of 0.58 due to the clarity and sharpness of the image, while the pose of the face being away from the camera results in a lower score than if the face was directed towards the camera.

Figure 3:
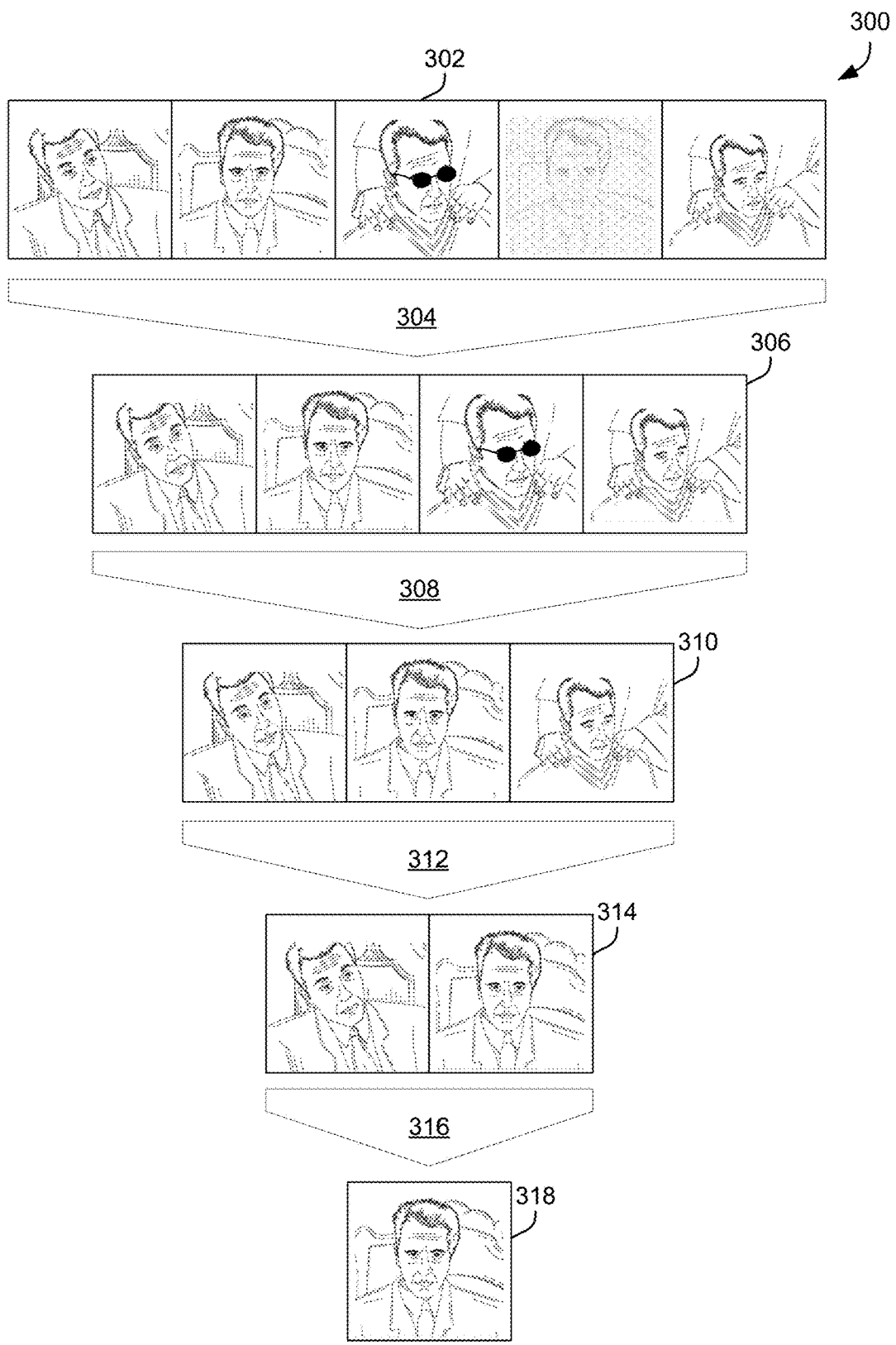
FIG. 3 illustrates a representation of a filtering process for ranking and selecting representative images for an individual from a set of images.

FIG. 3 illustrates a representation of a filtering process 300 for ranking and selecting representative images for an individual from a set of images. The filtering process 300 relies on removing faces that do not meet certain requirements to iteratively filter to a representative image rather than selecting the representative image outright. In the filtering process 300, images with faces that satisfy some or all of certain criteria may be prioritized over images that achieve a highest score according to a single criteria alone. In this filtering process 300, the images 302 are passed through a series of filters 304, 308, 312, and 316 and, based on their metrics in different parameters. The order of the filters 304, 308, 312, and 316 may change and vary based on particular circumstances, and one or more of the filters may be similar or identical to a previously applied filter. The series of filters 304, 308, 312, and 316 include filters that remove images having low sharpness (or high blurriness), remove images where the face of an individual is obstructed, remove images where the face of the individual is directed away from the imaging device (e.g., pose of the face), and based on the alignment and/or facial features of the individual. Other filters may be used to remove images from the set of images to result in the final image 318. In each of these filters 304, 308, 312, and 316, the filtering process 300 selects images that match any of the 3 following conditions: (1) the image has a score with respect to the parameter equal to or greater than a threshold; (2) the rank of the image with respect to the score is within a minimum amount; and (3) a percentile score based on the score being equal to or greater than a minimum percentile. For example, with respect to a particular parameter, such as brightness, sharpness, pose, etc., the images 302 are evaluated by a heuristic and/or algorithm configured to generate a score for the parameter. The images are then ranked with respect to their performance on the parameter and a percentile rank for the images is determined based on the ranking. Images not meeting certain threshold score requirements and/or percentile rank requirements are filtered out at filter 304 before proceeding with a continued filtering process at filter 308, 312, and 316 to continue to remove images through the filtering in a step-wise manner.

In the filtering process 300, the first images 302 are filtered at the first filter 304 based on evaluation of the images for image brightness. Images having low brightness are removed at the first filter 304, with the fourth image from the left removed for having a low brightness making the image difficult to observe. The second set of images 306 are filtered at the second filter 308 based on face completeness and/or obstructions. In the second filter 308, the third image of images 306 is removed for having sunglasses obscuring the face of the individual. The third set of images 310 are filtered by the fourth filter 312 that evaluates the faces for face size. The face size may be evaluated based on the number of pixels within the area of the image. The third image has a lowest face score due to the smallest face size of the third set of images 310. The fourth set of images 314 are evaluated and filtered at the fifth filter 316 that evaluates the faces for face pose, with faces posed with the face directed furthest away from the camera receiving the lowest scores. Of the fourth set of images 314, the first image has a pose with a face furthest from the camera, resulting in the lowest pose score for that image. As a result, the fifth image 318 is selected as the representative image for the individual.

Though the particular images and filters for the filtering process 300 are discussed with respect to FIG. 3, other filter orders, types of filters, and arrangements may be implemented in some examples. In some examples, additional filters for other features may be implemented. In some examples, the filtering process 300 may be performed iteratively to reduce the number of images from a large set of images to the representative image.

At a final stage of the filtering process 300, a single image 318 may be selected based on being an only remaining image. In some examples, after passing through the filters 304, 308, 312, and 316, multiple images may remain and a representative face may be selected based on a final score for the images, such as shown in FIG. 2. In some examples, the filtering process 300 may be performed iteratively to continually reduce the number of images until a representative image is identified for selection to display for the individual.

The filtering process 300 may rely on the percentile rank for the feature scores of features as represented in the various images and is more powerful for datasets with a large number of faces. The percentile distribution of scores over a large number of faces is useful for effective filtering to remove underperforming images according to the parameters of the headshot selection process. The percentile rank for each of images with respect to each feature may be used to aggregate an overall score for the image based on the feature scores. The percentile rank may then be used obtain weak supervision labels for training a machine learning model capable of predicting and/or determining a face quality score between 0 and 1, as described herein. For instance, the percentile score may be based on the rank of each image relative to the other images within the set. For example, in a set of 100 images, sorting the images by the scores for the features, with each of the images arranged in increasing order of the feature score. The percentile rank corresponds to the location of the image within the ranked listing. The percentile rank may be reflected as a percent, reflective of the feature score as it relates to the function scores of the other images. The feature scores may be determined by a heuristic score function to obtain weak supervision labels for training a machine learning model to predict a face quality score between 0 and 1. For example, after determining the feature scores and arranging the images according to the quality scores, the percentile rank may be determined and assigned to a quality score between 0 and 1.

In some examples, heuristics may be used to determine more robust scores and to introduce non-linearity between the features used and labels for the images in the dataset. A first heuristic is a linear function based on the percentile scores obtained from identified features. A second heuristic may also be based on score thresholds and percentile thresholds for the features. The second heuristic may divide the images into different buckets based on the scores and then assign scores according to the assigned buckets for each. After normalizing scores from the first heuristic, labels for the image dataset may be determined by evaluating an average of the first heuristic score and the second heuristic score.

The training labels associated with the images, comprising the scores for each image, may be used to train one or more models to generate quality scores for future sets of images. In some examples, the models may include machine learning models such as ResNet, EfficientNet, and FaceNet by using the face image and training label data. In some examples, the features of the images and the associated scores do not have reliability scores, but instead only have the scores produced as described herein. In some examples, the features of the images (e.g., brightness, resolution, sharp-ness, roll, pitch and yaw, etc.) may be used as inputs for a regression model. The regression model may be based on a decision tree, linear regression, boosting, and deep learning.

Figure 4:
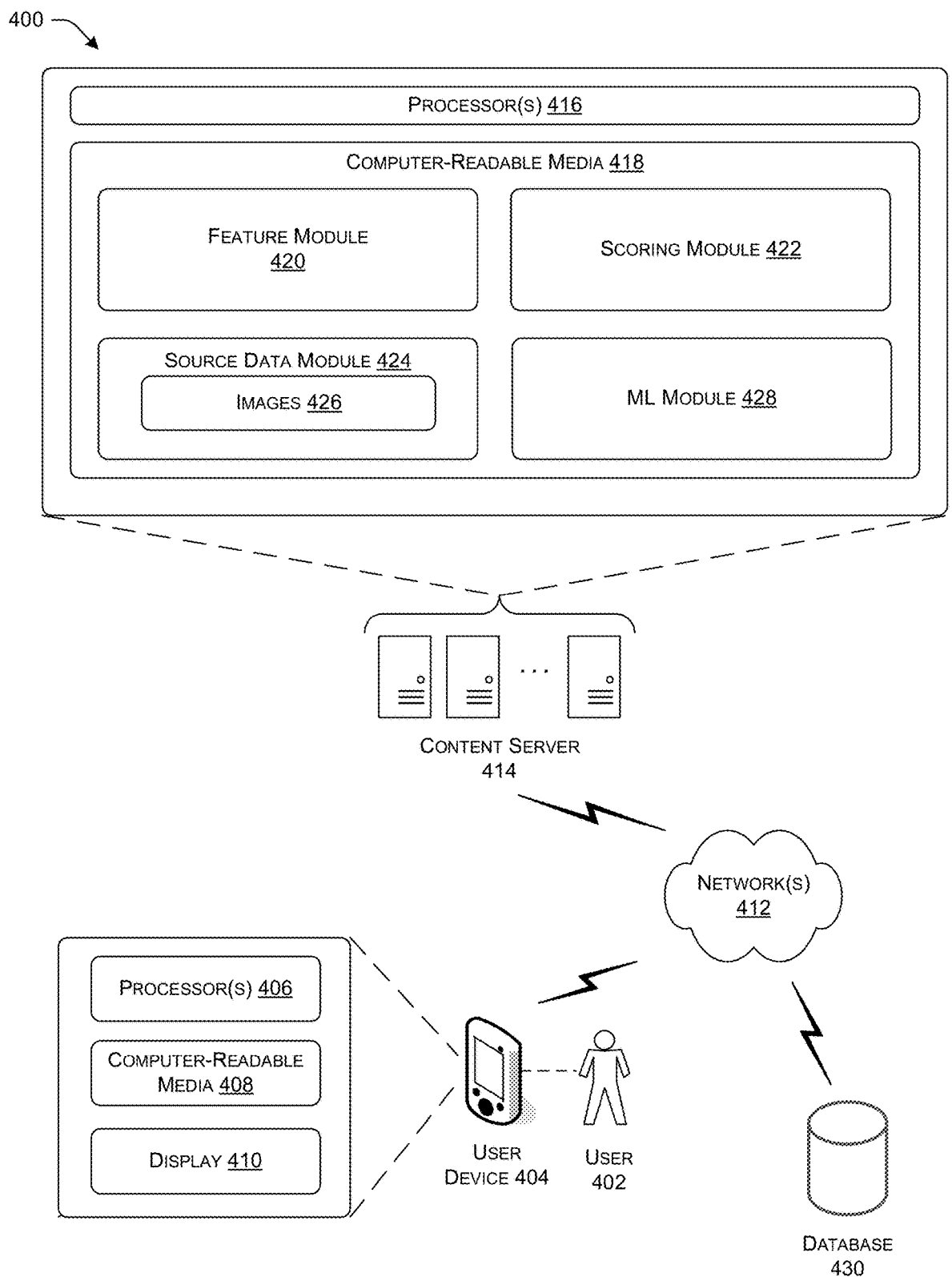
FIG. 4 illustrates an example system for generating and providing curated headshots for individual identification, according to the present description.

FIG. 4 illustrates an example system 400 for generating and providing curated headshots for individual identification, according to the present description. More particularly, the example system 400 may be used to rank and select a representative headshot or image from among a set of images as well as provide the headshots for access by a user 402 via a user device 404. The curated headshots may be ranked as described herein using the systems and modules of FIG. 4. Though FIG. 4 is shown having particular modules and elements, other modules, components, or elements may be used to accomplish the techniques associated therewith. The elements of the example system 400 illustrate an example environment for ranking and selecting representative headshots and interacting with those headshots, such as providing to a user 402 for viewing and consumption.

As shown in FIG. 4, the example system 400 may include one or more users 402, one or more user devices 404 associated with the users 402, one or more network(s) 412, a database 430 having images stored thereon, and one or more content server(s) 414. In various embodiments, the user 402 may operate the user device 404, which may include one or more processor(s) 406, computer-readable media 408 and a display 410. The content server 414 may also include one or more processor(s) 416 and computer-readable media 418, which may include a feature module 420, a scoring module 422, a source data module 424, and a machine learning (ML) module 428.

In various embodiments, the content server 414 may be a service provider, a service, a video hosting service, or any number of servers or entities that may provide products, services, promotions, articles, advertisements, and/or other media to consumers.

In some embodiments, the user 402 may operate the user device 404 to perform various functions associated with the user device 404, which may include the one or more processor(s) 406, the computer-readable media 408, and the display 410. Furthermore, the user 402 may use the user device 404 to interact with a video, image, article, or other media, to interact with the content server 414, such as via a website or an application associated with a user device 404.

In some embodiments, the user device 404 may be any type of device that is capable of receiving, accessing, searching data and displaying data to the user 402. For instance, the user device 404 may include a personal computer, a laptop computer, a cellular telephone, a PDA, a tablet device, an electronic book (e-Book) reader device, or any other device that may be used to view image data or to access a platform (e.g., website, application, etc.) associated with the content server 414. The user device 404 shown in FIG. 4 is only one example of a user device 404 and is not intended to suggest any limitation as to the scope of use or functionality of any user device 404 utilized to perform the processes and/or procedures described herein.

The processor(s) 406 of the user device 404 may execute one or more modules and/or processes to cause the user device 404 to perform a variety of functions, as set forth above and explained in further detail in the following disclosure. In some embodiments, the processor(s) 406 may include a central processing unit (CPU), a graphics processing unit (GPU), both CPU and GPU, or other processing units or components known in the art. Additionally, each of the processor(s) 406 may possess its own local memory, which also may store program modules, program data, and/or one or more operating systems.

In at least one configuration, the computer-readable media 408 of the user device 404 may include any components that may be used to receive, access, or view images and headshots curated, selected, and provided by the content server 414. Depending on the exact configuration and type of the user device 404, the computer-readable media 408 may also include volatile memory (such as RAM), non-volatile memory (such as ROM, flash memory, miniature hard drive, memory card, or the like), or some combination thereof. In some examples, the user device 404 may include modules similar or identical to the feature module 420, scoring module 422, source data module 424, and/or ML module 428. The user device 404 may use the modules to perform the methods described herein without the need to access the content server 414. For example, the user device 404 may use the modules described herein to curate headshots of individuals included in a group of photos taken by an imaging device of the user device 404 (e.g. a cameral roll or the user device 404).

In various embodiments, the user device 404 may also have input device(s) such as a keyboard, a mouse, a pen, a voice input device, a touch input device, etc. The user device 404 may also include the display 410 and other output device(s), such as speakers, a printer, etc. The user 402 may utilize the foregoing features to interact with the user device 404 and/or the content server 414 via the network(s) 412. More particularly, the display 410 of the user device 404 may include any type of display 410 known in the art that is configured to present (e.g., display) information to the user 402.

In some embodiments, the network(s) 412 may be any type of network known in the art, such as the Internet. Moreover, the user device 404, database 430, and the content server 414 may communicatively couple to the network(s) 412 in any manner, such as by a wired or wireless connection. The network(s) 412 may also facilitate communication between the user device 404, database 430, and the content server 414. For instance, the content server 414 may provide the one or images, videos, headshots, metadata, or other information to user devices 404 via the network(s) 412.

In addition, and as mentioned previously, the content server 414 may include the one or more processor(s) 416 and the computer-readable media 418. The content server 414 may also include additional components not listed above that may perform any function associated with the content server 414. In various embodiments, the content server 414 may be any type of server, such as a network-accessible server, and may be one of multiple servers included in a server cluster or server farm. In other embodiments, the processor(s) 416 and the computer-readable media 418 of the content server 414 may be the same as, similar to, or different from the processor(s) 406 and the computer-readable media 408, respectively, of the user device 404.

The source data module 424 may maintain or be associated with one or more images 426 (including sequences of images such as videos), collections of headshots, image galleries, and other such images. The source data module 424 may include one or more databases or access to one or more databases including images 426 that may include sequence of images, individual images, and other such data. In some examples, the images 426 may include images of existing headshots associated with individuals that may be used for further headshot generation.

In some examples, the images 426 of the source data module 424 may be accessed from the database 430. The headshots of the images 426 may be extracted from a source of one or more images using a face detection algorithm. The face detection algorithm may include any suitable machine learning model trained using labeled faces either to identify particular identities and/or to identify a face within an image that may be identified at a later stage. The images may be selected based on identification of faces and identification of poses and/or other characteristics that lead to a successful headshot. Such characteristics include the entire face of the individual being visible, having a brightness and sharpness above a threshold level, and other such factors that result in clearly visible faces of individuals. After identifying the individual or presence of the individual within the images, the images may have optional characteristics adjusted, for example to change an image tone, brightness, background blur, alignment of the individual with a vertical axis, and/or sharpness to improve the resulting headshot. After identifying the images and detecting the faces within the images, the headshots may be extracted by defining a bounding box around the face and/or head of the user. The bounding box may be established using heuristics and/or a trained machine learning model. The heuristics may define features of the resulting headshot cropped by the bounding box. In some instances, the heuristics may include identifying a face within an upper half or upper third of the headshot image; centering the face of the individual; cropping all or a portion of the hair of the individual; and including an upper portion of the shoulders of the individual. The resulting bounding box, defined using the parameters defined above, may then be used to crop the image to produce the resulting headshot. The headshots may be stored at the database 430 and/or in association with the source data module 424. The headshots may be ranked and a representative headshot and/or image may be selected from the images 426 as described herein.

The feature module 420 may operate to identify features within the images and evaluate the images based on those features. In a first example, the feature module 420 may determine one or more cost functions that may be used to evaluate the set of images. The cost functions may include a pose cost function, a size cost function, a face cost function, a brightness cost function, a sharpness cost function, and/or a feature cost function. The feature module 420 may implement one or more machine learning models to identify and evaluate the features within the images, the features including various features described herein. The pose cost function may describe the pose of the face of the individual within the images, with a low cost associated with a front-facing head within the images while a high cost is associated with a face directed away from an imaging device that captured the image. The size cost function may be associated with a resolution of the image at the location of the face, with a low cost associated with a high-resolution image for the face. The face cost function may be a combination of other cost functions, such as adding the poise cost function and the size cost function together, among other cost functions, to produce a final cost function for the face. Other cost functions may provide costs for the images based on a brightness, sharpness, or other image feature, characteristic, or quality of the images. The brightness cost function may be determined by calculating the brightness of the face image by calculating a mean value of the brightness across the pixels of the image, with lower average brightness associated with a lower mean value of brightness across the pixels. The size cost function may be implemented by first identifying faces from within the image data using a face detection algorithm on the images. The area of the bounding box, described with respect to pixels, and thereby reflective of resolution of the image, may be used for determining the size cost, with a larger pixel area or resolution associated with a lower size cost. Quality Assessment for Face Recognition based on Deep Learning, which may judge the sharpness of the image and output a score between 0 and 1 for suitability of the image for face matching. The pose cost function may use various proprietary and open-source solutions, including Deep Gase, Hopenet, FSANet, etc., to calculate a roll, pitch, and yaw value for a face within an image.

The scoring module 422 may determine scores for each of the images and determine a representative image based on the cost functions and the scores. In some examples, the representative image is selected based on the representative image having a smallest cost score among the cost scores generated using the cost functions described herein. In some examples, the representative image may be selected based on one or more cost scores, the face cost score, and/or averages of the cost scores identifying images with the most suitable characteristics for an aesthetically pleasing representative image.

In some examples, the scoring module 422 may also determine representative images in two phases. In a first phase, a cascade of filters is implemented to filter out faces which perform poorly in a series of tests. The filtering operation is performed after each of the cascade of filters by rejecting low quality faces based on feature criteria. The feature criteria may include inputs of face size (e.g., resolution), face quality scores (e.g., from a deep learning model for identifying face quality with stress on face sharpness), face pose (inferred using a deep learning model), and illumination of the faces. After the iterative filtering of the images using the cascaded filters, the faces may be ranked according to their scores on the various filters and tests. A highest ranked remaining face after the cascade of filters may be selected as the representative face.

In a second phase, the scoring module 422 may also use the ranking of the face images from the first phase to generate a scoring mechanism for headshot quality score determination. The quality score may be determined based on a percentile score describing the percentile rank of each image among the set of images for an individual for each feature in a heuristic score function to obtain weak supervision labels for training a machine learning model to predict a face quality score between 0 and 1. The quality scores may be based on one or more heuristics. A first heuristic is based on a combination of percentile scores while a second heuristic is based on a score derived from bucketing of percentiles of individual feature quality measures. The individual features may include illumination, resolution, sharpness, roll, pitch, and yaw as input quality features to train the machine learning model. The machine learning model may be trained using the dataset derived from the heuristics and scores and may subsequently be used to generate further quality scores for further sets of images.

The scoring module 422 may select the representative headshots as described herein and subsequently provide the representative headshots for individuals in the images.

The ML module 428 may include one or more machine learning models that may perform one or more tasks as described herein, including individual identification, face recognition, feature recognition, feature scoring, and ranking of images, as well as determination of scores for images using trained machine learning models. For example, several suitable algorithms are available on the market, including the FaceVACS® software by Cognitec Systems GmbH, FaceSDK offered by Luxand, Inc., and FaceRecognizer by OpenCV. In some examples, the models may include machine learning models such as ResNet, EfficientNet, and FaceNet by using the face image and training label data. In some examples, the features of the images and the associated scores do not have reliability scores, but instead only have the scores produced as described herein. In some examples, the features of the images (e.g., brightness, resolution, sharp-ness, roll, pitch and yaw, etc.) may be used as inputs for a regression model that operates within the ML module 428. The regression model may be based on a decision tree, linear regression, boosting, and/or deep learning.

Figure 5:
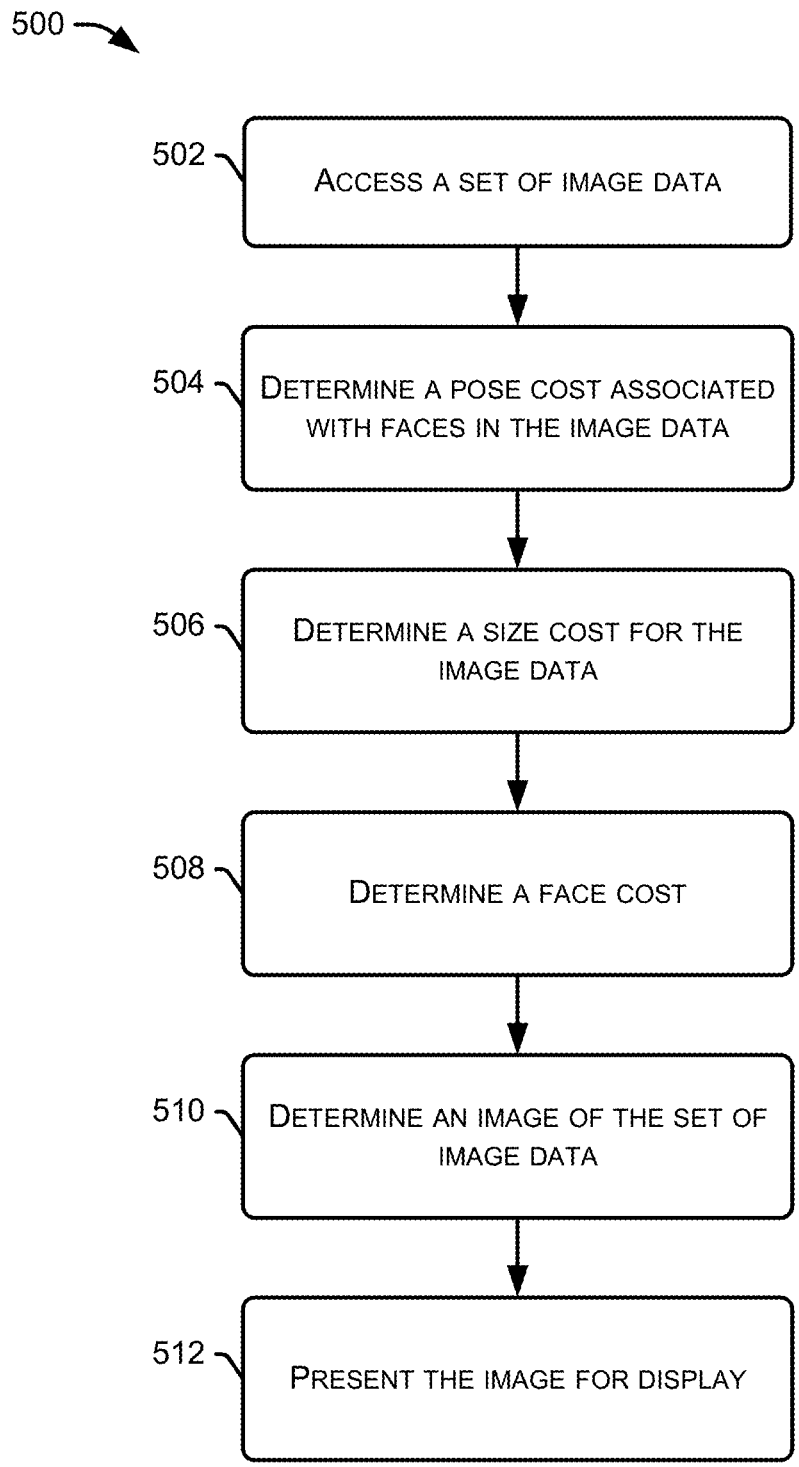
FIG. 5 illustrates an example process for curating headshots of individuals to provide consistent and visually appealing headshots used in identification of individuals, according to the present description.
Figure 6:
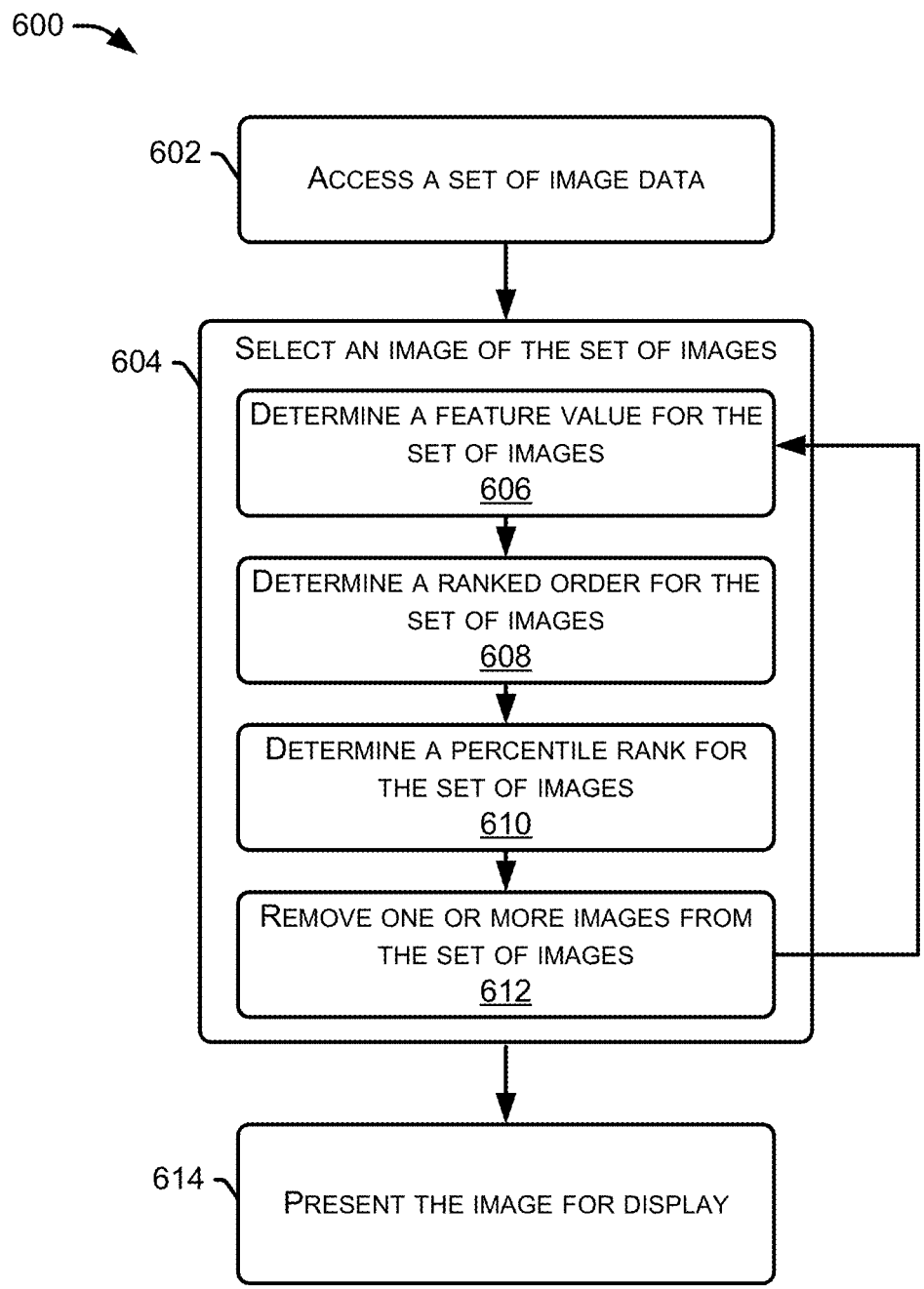
FIG. 6 illustrates a process for curating headshots of individuals to provide consistent and visually appealing headshots used in identification of individuals, according to the present description.

FIGS. 5 and 6 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

FIG. 5 illustrates a process 500 for curating headshots of individuals to provide consistent and visually appealing headshots used in identification of individuals, according to the present description. The process 500 may be carried out by a computing system or device, such as the computing device 120, the content server 414 of FIG. 4, and/or the computing device 700 of FIG. 7.

At 502, the process 500 includes accessing a set of image data. The set of image data may include image data extracted from one or more frames of a video. The image data may also include a gallery of images including headshots of various individuals. The images may include cropped headshots of the individuals that may be extracted from the video, source image, or other sources of image data. The image data may be stored in a database and be sorted according to individual identity, e.g., the identity of the individual within the image such that sets of images may include subsets of images corresponding to different individuals. As such, the sets of images may be selected based on identity and processed by identity, to batch process the images of a single individual at one time.

At 504, the process 500 includes determining a pose cost associated with faces in the image data. The pose cost function may describe the pose of the face of the individual within the images, with a low cost associated with a front-facing head within the images while a high cost is associated with a face directed away from an imaging device that captured the image. The pose cost function may describe the pitch, yaw, and roll of the head or face of the individual within the image using various techniques, with the pitch, yaw, and roll each used to determine the pose cost. The pose cost function may describe the pose of the face of the individual within the images, with a low cost associated with a front-facing head within the images while a high cost is associated with a face directed away from an imaging device that captured the image. The pose cost function may use various proprietary and open-source solutions, including Deep Gase, Hopenet, FSANet, etc., to calculate a roll, pitch, and yaw value for a face within an image.

At 506, the process 500 includes determining a size cost for the image data. The size cost function may be associated with a resolution of the image at the location of the face, with a low cost associated with a high resolution image for the face. The size cost function may be implemented by first identifying faces from within the images using a face detection algorithm on the images that defines a bounding box around a face within the images. The area of the bounding box, described with respect to pixels, and thereby reflective of resolution of the image, may be used for determining the size cost, with a larger pixel area or resolution associated with a lower size cost.

In some examples, the process 500 may also include determining additional feature costs for the image data. The additional feature costs may include a brightness cost function, a sharpness cost function, and/or a feature cost function. Other cost functions may provide costs for the images based on a brightness, sharpness, or other image feature, characteristic, or quality of the images. The brightness cost function may be determined by calculating the brightness of the face image by calculating a mean value of the brightness across the pixels of the image, with lower average brightness associated with a lower mean value of brightness across the pixels. Additional cost functions may evaluate the images based on the appearance of the individual, including whether the individual is wearing glasses, sunglasses, a mask, smiling, frowning, and/or making other facial expressions.

At 508, the process 500 includes determining a face cost for each of the images. The face cost function may be a combination of other cost functions, such as adding the poise cost function and the size cost function together, among other cost functions, to produce a final cost function for the face. In some example the face cost may be an average of various other cost functions that contribute to the face cost.

At 510, the process 500 includes determining an image of the set of image data based on the face cost. The scores for the various features, including the face cost, may be used to select a representative image. In some examples, the representative image is selected based on the representative image having a smallest cost score among the cost scores generated using the cost functions described herein. In some examples the cost score being larger may be reflective of a better image quality with respect to the one or more features, and the cost scores being aggregated together to a larger quality score may be used to select a representative image having a highest quality score. In some examples, the representative image may be selected based on one or more cost scores, the face cost score, and/or averages of the cost scores identifying images with the most suitable characteristics for an aesthetically pleasing representative image.

At 512, the process 500 includes storing and presenting the image for display at a display device of a user device when recalled by a user seeking information about a particular individual within the images. The image may be stored in connection with the video or source of images for access by the user to view the representative image of the individual.

FIG. 6 illustrates a process 600 for curating headshots of individuals to provide consistent and visually appealing headshots used in identification of individuals, according to the present description. The process 600 may be carried out by a computing system or device, such as the computing device 120, the content server 414 of FIG. 4, and/or the computing device 700 of FIG. 7.

At 602, the process 600 includes accessing a set of image data. The set of image data may include image data extracted from one or more frames of a video. The image data may also include a gallery of images including headshots of various individuals. The images may include cropped headshots of the individuals that may be extracted from the video, source image, or other sources of image data. The image data may be stored in a database and be sorted according to individual identity, e.g., the identity of the individual within the image such that sets of images may include subsets of images corresponding to different individuals. As such, the sets of images may be selected based on identity and processed by identity, to batch process the images of a single individual at one time.

At 604, the process 600 includes selecting an image of the set of images. Step 604 includes several sub-steps that may be used in a single or iterative manner to select a representative image of the set of images. The representative image may be a clearest, aesthetically appealing, or other image selected for purposes of identifying an individual in a consistent and aesthetically consistent manner. Selecting the image may include using one or more machine learning algorithms or function sin a cascaded filter arrangement. In some examples, the process 600 may be used to select images and generate scores for each of the images in the image set, the images and scores used to train a machine learning model to generate scores for additional sets of images.

At 606, the process 600 includes determining a feature value for the set of images. The feature value is, in a first iteration, determined based on a first feature of the image and/or the face. The first feature may be, for example, the brightness, sharpness, pose, size, face obstruction, or other features of images and/or faces within images. The feature value may include inputs of face size (e.g., resolution), face quality scores (e.g., from a deep learning model for identifying face quality with stress on face sharpness), face pose (inferred using a deep learning model), and illumination of the faces. The feature value is determined using one or more heuristics and/or machine learning models to generate a score reflective of the feature within the image.

At 608, the process 600 includes determining a ranked order for the set of images. After the feature value is determined for the first feature, the images of the faces may be ranked according to their scores on the first feature value. In some examples, a highest ranked remaining face after the cascade of filters may be selected as the representative face. The ranking of the images may be based on generating a sequential order of the images based on their feature values. In some examples the ranking may be based on buckets of scores, for example grouping images with similar and/or identical feature values together in a ranked manner.

At 610, the process 600 includes determining a percentile rank for the set of images. The percentile rank may be determined based on the rank of the image as a function of the total number of images within the set of images. The percentile rank may provide a score on a scale from 0 to 100 of the rank of the image relative to the other images in the set of images. In this manner, each of the images may have a unique score relative to one another.

At 612, the process 600 includes removing one or more images from the set of images. The images removed from the set of images may be selected based on the percentile rank of the images. In some examples, the percentile rank of the images may be used to remove images having a feature value percentile rank below a threshold, such as the bottom twenty percent of images. By removing the bottom portion of the images, images that are well-rounded in multiple features may be selected as representative figures as the step 604 is repeated for various different features of the images. In some examples, no images may be removed from the set of images for a particular filter. In a case where the images all exceed a threshold feature value for the filter, the process 600 may cause the images to be maintained as all of the images meet or exceed the threshold feature value for the particular filter. In such examples, the process may continue iteratively with additional filters to continue to remove images from the set of images.

In some examples, the feature value, including the percentile rank for the feature value of one or more feature values may be used to generate a scoring mechanism for headshot quality score model. In such examples, the headshot quality score model may be trained using the data produced by step 604.

At 614, the process 600 includes presenting the selected image for display. The operation may include storing and presenting the image for display at a display device of a user device when recalled by a user seeking information about a particular individual within the images. The image may be stored in connection with the video or source of images for access by the user to view the representative image of the individual.

Figure 7:
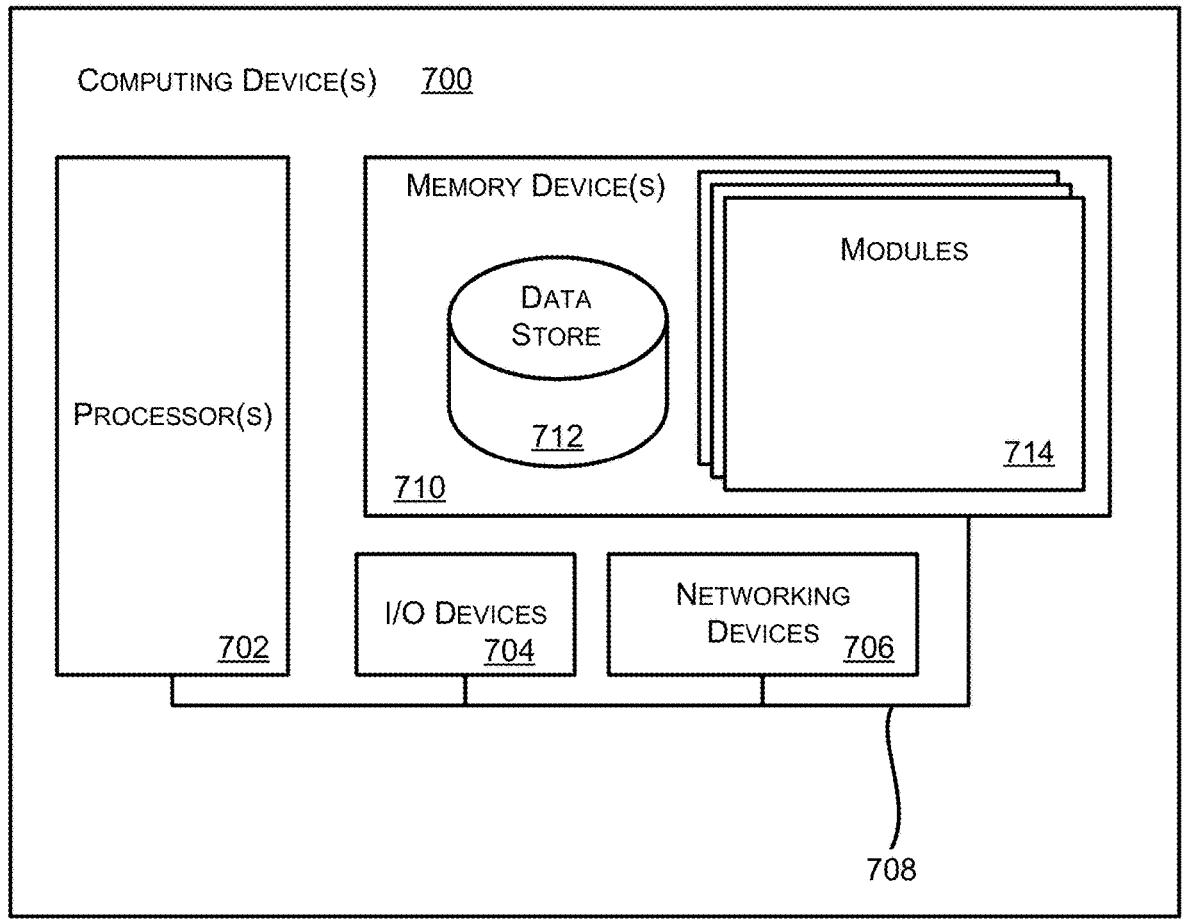
FIG. 7 illustrates a block diagram of a computing system for use in generating and curating headshots, according to the present description.

FIG. 7 illustrates a block diagram of a computing device 700 for use in generating and curating headshots, according to the present description. The computing device 700 may include one or more computing devices on which services or modules of this technology may execute. The computing device 700 is illustrated on which a high-level example of the technology may be executed. The computing device 700 may be an example of the computing device 120 and/or the content server 414 of FIG. 4. The computing device 700 may include one or more processors 702 that are in communication with memory devices 710. The computing device 700 may include a local communication interface 708 for the components in the computing device. For example, the local communication interface 708 may be a local data bus and/or any related address or control busses as may be desired.

The memory device 710 may contain modules 714 that are executable by the processor(s) and data for the modules 714. The module 714 may include the modules shown and described with respect to FIG. 4, among others. A data store 712 may also be located in the memory device 710 for storing data related to the modules and other applications along with an operating system that is executable by the processor 702.

The computing device 700 may further include or be in communication with a client device, which may include a display device. The client device may be available for an administrator to use in interfacing with the computing device 700, such as to review operation of a virtual computing instance, make improvements to machine learning models and so forth.

Various applications may be stored in the memory device 710 and may be executable by the processor 702. Components or modules discussed in this description that may be implemented in the form of software using high programming level languages that are compiled, interpreted or executed using a hybrid of the methods.

The computing device 700 may also have access to I/O (input/output) devices 704 that are usable by the computing devices. An example of an I/O device 704 is a display screen that is available to display output from the computing devices. Other known I/O device may be used with the computing device as desired. Networking devices 706 and similar communication devices may be included in the computing device 700. The networking devices 706 may be wired or wireless networking devices 706 that connect to the internet, a LAN, WAN, or other computing network.

The components or modules that are shown as being stored in the memory device 710 may be executed by the processor 702. The term "executable" may mean a program file that is in a form that may be executed by a processor 702. For example, a program in a higher level language may be compiled into machine code in a format that may be loaded into a random access portion of the memory device 710 and executed by the processor 702, or source code may be loaded by another executable program and interpreted to generate instructions in a random access portion of the memory to be executed by a processor 702. The executable program may be stored in any portion or component of the memory device 710. For example, the memory device 710 may be random access memory (RAM), read only memory (ROM), flash memory, a solid state drive, memory card, a hard drive, optical disk, floppy disk, magnetic tape, or any other memory components.

The processor 702 may represent multiple processors and the memory device 710 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A method comprising:
    accessing a set of images that depict a face of an individual;
    for individual images of the set of images, selecting an image of the set of images by at least iteratively:
        determining a first feature value associated with a first feature of the face within individual images of the set of images;
        determining a first ranked order for the individual images based at least in part on the first feature value;
        determining a first percentile rank for the individual images based at least in part on the first ranked order;
        determining a second feature value associated with a second feature of the face within individual images of the set of images;
        determining a second ranked order for the individual images based at least in part on the second feature value;

determining a second percentile rank for the individual images based at least in part on the second ranked order; and removing one or more images from the individual images based at least in part on the first percentile rank and the second percentile rank to reduce the set of images to the image; and storing the image in association with the individual.

2. The method of claim 1, wherein the feature includes at least one of:

a resolution of the face in the image;
a sharpness of the face in the image;
a pose of the face in the image;
a facial expression of the face in the image;
an article of clothing associated with a head of the individual; or
a brightness of the face in the image.

3. The method of claim 1, further comprising:

generating a training data set for a machine learning algorithm, the training data set including the set of images labeled with quality scores based at least in part on the percentile ranks associated with the feature; and training a machine learning model using the training data set, the machine learning model configured to determine a face quality score for faces within image data.

4. The method of claim 3, further comprising:

accessing a second set of images of a second face of a second individual; and determining a face quality score for second individual images of the second set of images using the machine learning model.

5. The method of claim 1, wherein removing the one or more images from the individual images is further in response to the one or more images having feature values below a threshold feature value score.

6. The method of claim 5, wherein the set of images comprise a plurality of images extracted from the video based at least in part on an identity of the individual being present within the set of images.

7. A non-transitory computer-readable medium having instructions stored thereon that, when executed by one or more processors, cause the one or more processors to perform operation comprising:

accessing a set of images that depict a face of an individual;

selecting an image of the set of images by at least:
determining a feature value associated with a feature of the face within individual images of the set of images;
determining a ranked order for the individual images based at least in part on the feature value;
determining a percentile rank for the individual images based at least in part on the ranked order; and
removing one or more images from the set of images in response to the percentile rank for the one or more images failing to satisfy a threshold, wherein:
selecting the image comprises iteratively determining the feature value, determining the ranked order, determining the percentile rank, and removing one or more additional images of the set of images based at least in part on the percentile rank;
iteratively determining the feature value comprises:
determining a first feature value during a first iteration for a first feature, the ranked order is a first ranked order for the first feature, and the percentile rank is a first percentile rank based at least in part on the first ranked order; and
determining a second feature value during a second iteration for a second feature, determining a second ranked order based at least in part on the second feature value, and determining a second percentile rank based at least in part on the second ranked order; and presenting the image to a computing device in response to a user request for information about the individual.

8. The non-transitory computer-readable medium of claim 7, the operations further comprising:

generating a training data set for a machine learning algorithm, the training data set including the set of images labeled with quality scores based at least in part on the percentile ranks associated with the feature; and training a machine learning model using the training data set, the machine learning model configured to determine a face quality score for faces within image data.

9. The non-transitory computer-readable medium of claim 8, the operations further comprising:

accessing a second set of images of a second face of a second individual; and determining a face quality score for second individual images of the second set of images using the machine learning model.

10. The non-transitory computer-readable medium of claim 7, wherein the set of images are extracted from a plurality of images forming a video; and the user request for information about the individual is in response to the user viewing the video.

11. The non-transitory computer-readable medium of claim 10, wherein the set of images comprise a set of images extracted from the video based at least in part on an identity of the individual being present within the set of images.

12. The non-transitory computer-readable medium of claim 7, wherein accessing the set of images comprises:

identifying a representation of the individual in frames of a video;

extracting the set of images from the frames of the video using a machine learning model trained to determine a bounding box around a head of the individual and crop the frames to generate one or more headshots of the individual.

13. A method comprising:

accessing a set of images that depict a face of an individual;

selecting an image of the set of images by at least:
determining a feature value associated with a feature of the face within individual images of the set of images;
determining a ranked order for the individual images based at least in part on the feature value;
determining a percentile rank for the individual images based at least in part on the ranked order;
removing one or more images from the set of images in response to the percentile rank for the one or more images failing to satisfy a threshold; and
iteratively determining the feature value, determining the ranked order, determining the percentile rank, and removing one or more additional images of the set of images based at least in part on the percentile rank, wherein;
a first feature value is determined during a first iteration for a first feature, the ranked order is a first ranked order for the first feature, and the percentile rank is a first percentile rank based at least in part on the first ranked order; and a second feature value is determined during a second iteration for a second feature, determining a second ranked order based at least in part on the second feature value, and determining a second percentile rank based at least in part on the second ranked order; and presenting the image to a computing device in response to a user request for information about the individual.

14. The method of claim 13, further comprising:

generating a training data set for a machine learning algorithm, the training data set including the set of images labeled with quality scores based at least in part on the percentile ranks associated with the feature; and training a machine learning model using the training data set, the machine learning model configured to determine a face quality score for faces within image data.

15. The method of claim 13, further comprising:

accessing a second set of images of a second face of a second individual; and determining a face quality score for second individual images of the second set of images using the machine learning model.

16. The method of claim 13, wherein removing the one or more images from the individual images is further in response to the one or more images having feature values below a threshold feature value score.

17. The method of claim 16, wherein the set of images comprise a plurality of images extracted from the video based at least in part on an identity of the individual being present within the set of images.

* * * * *